United States Patent Office.

ARTHUR TOWNE, OF AUBURN, MAINE.

Letters Patent No. 104,665, dated June 21, 1870.

IMPROVED COMPOSITION BRONZE-PAINT.

The Schedule referred to in these Letters Patent and making part of the same.

*To all whom it may concern:*

Be it known that I, ARTHUR TOWNE, of Auburn, in the county of Androscoggin and in the State of Maine, have invented certain new and useful Improvements in Bronzing Preparation; and do hereby declare that the following is a full, clear, and exact description thereof.

The nature of my invention consists in a compound for bronzing and gilding, as will be hereinafter fully set forth.

My compound consists of balsam fir and spirits turpentine, mixed together in any desired proportions; and to this mixture is added the bronzing or gilding-powder, of any desired tint or shade. Or the powder may be mixed at the same time with the other ingredients.

This composition may be made in liquid form, so as to be applied with a brush at once; or it may be put up in the shape of a paste, and then, when it is to be used, turpentine and balsam fir to be added, so as to make a liquid of the paste.

The article, when bronzed or gilded, may be covered by a coat of light varnish.

This composition, being in paste form, can be more easily put up and shipped than when in liquid form.

Liquid glue may be mixed in certain proportions with the other ingredients, if so desired, to make it more adhesive, and also to impart more of a polish to the articles bronzed.

In some cases, the liquid glue alone, with the bronzing or gilding-powder, might answer all the purposes desired.

Having thus fully described my invention,

What I claim as new, and desire to secure by Letters Patent, is—

As a new article of manufacture, a bronze or gilding-compound, consisting of balsam fir, turpentine, and any metallic bronzing or gilding-powder, whether said compound is made in a liquid or paste state, substantially as set forth.

In testimony that I claim the foregoing, I have hereunto set my hand this 21st day of May, 1870.

ARTHUR TOWNE.

Witnesses:
C. L. EVERT,
A. N. MARR.